(12) United States Patent
Paton et al.

(10) Patent No.: US 7,566,092 B2
(45) Date of Patent: *Jul. 28, 2009

(54) ELECTROMECHANICAL STRUT

(75) Inventors: Gordon Andrew Paton, Sharon (CA); Stephen A. G. Mitchell, Windsor (CA)

(73) Assignee: Magna Closures Inc., Newmarket, Ontario (CA)

( * ) Notice: Subject to any disclaimer, the term of this patent is extended or adjusted under 35 U.S.C. 154(b) by 171 days.

This patent is subject to a terminal disclaimer.

(21) Appl. No.: 11/678,631

(22) Filed: Feb. 26, 2007

(65) Prior Publication Data

US 2007/0194599 A1    Aug. 23, 2007

Related U.S. Application Data

(63) Continuation-in-part of application No. 11/199,470, filed on Aug. 8, 2005, now Pat. No. 7,234,757.

(60) Provisional application No. 60/777,079, filed on Feb. 27, 2006, provisional application No. 60/599,742, filed on Aug. 6, 2004.

(51) Int. Cl.
*B60J 5/10* (2006.01)

(52) U.S. Cl. .................. 296/146.8; 296/56; 296/106

(58) Field of Classification Search ............. 296/146.8, 296/56, 106; 74/89.32, 89.33
See application file for complete search history.

(56) References Cited

U.S. PATENT DOCUMENTS

| | | |
|---|---|---|
| 2,371,336 A | 3/1945 | Levon |
| 2,738,972 A | 3/1956 | Morris |
| 4,821,456 A | 4/1989 | Nogaki |
| 5,187,993 A | 2/1993 | Nicholson et al. |
| 5,295,407 A | 3/1994 | Hirose et al. |
| 5,367,826 A | 11/1994 | Wu |

(Continued)

FOREIGN PATENT DOCUMENTS

DE    100 01 054    6/2001

(Continued)

OTHER PUBLICATIONS

English Abstract of FR 2814771 Dated Apr. 5, 2002; English Abstract of DE 10118303 Dated May 16, 2002; English Translation of DE 10001054 Dated Jun. 13, 2001

*Primary Examiner*—Dennis H Pedder
(74) *Attorney, Agent, or Firm*—Clark Hill P.L.C.

(57) ABSTRACT

An electromechanical strut is provided for moving a pivotal lift gate between an open position and a closed position relative to a motor vehicle body. The electromechanical strut includes a housing connected to one of the lift gate and the motor vehicle body. An extensible shaft is slidably mounted to the housing. The extensible shaft is connected to the other of the lift gate and the motor vehicle body. A drive mechanism includes a rotatable power screw. The drive mechanism converts rotary motion of the power screw into linear motion of the extensible shaft to move the extensible shaft between a retracted position corresponding to the closed position of the lift gate and an extended position corresponding to the open position of the lift gate. A power spring includes one end connected to the extensible shaft and another end connected to the housing for providing a mechanical counterbalance to the weight of the lift gate.

19 Claims, 4 Drawing Sheets

U.S. PATENT DOCUMENTS

| | | |
|---|---|---|
| 5,944,376 A | 8/1999 | Buchanan, Jr. |
| 6,185,868 B1 | 2/2001 | Kato |
| 6,516,567 B1 | 2/2003 | Stone et al. |
| 6,755,458 B1 | 6/2004 | Oberheide |
| 6,814,392 B1 | 11/2004 | Tomaszewski |
| 7,021,001 B1* | 4/2006 | Schooler ........................ 49/28 |
| 7,234,757 B2* | 6/2007 | Mitchell .................. 296/146.8 |
| 7,416,237 B1* | 8/2008 | Kachouch et al. ............. 296/56 |
| 2003/0085589 A1 | 5/2003 | Oberheide, Jr. et al. |
| 2006/0043763 A1 | 3/2006 | Berklich, Jr. et al. |
| 2006/0082188 A1 | 4/2006 | Mitchell |
| 2007/0137331 A1* | 6/2007 | Kachouh .................... 74/89.23 |
| 2007/0261310 A1* | 11/2007 | Porat et al. ..................... 49/340 |
| 2007/0262609 A1* | 11/2007 | King et al. ................ 296/146.8 |
| 2007/0296244 A1* | 12/2007 | Borrmann ................ 296/146.8 |

FOREIGN PATENT DOCUMENTS

| | | |
|---|---|---|
| DE | 101 18 303 | 5/2002 |
| FR | 2 814 771 | 4/2002 |

* cited by examiner

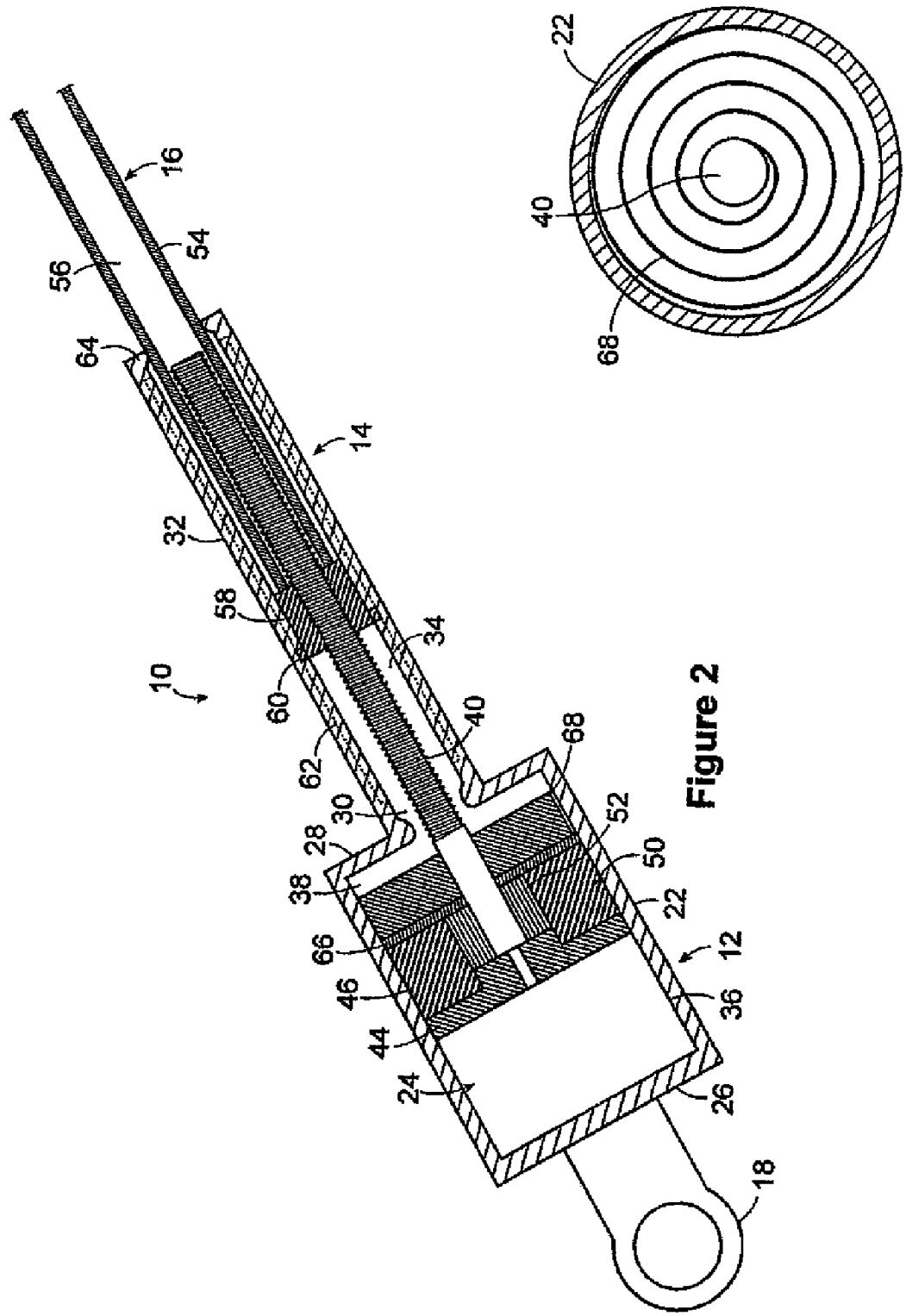

ELECTROMECHANICAL STRUT

CROSS-REFERENCE TO RELATED APPLICATIONS

This application is a continuation-in-part of U.S. Non-Provisional application Ser. No. 11/199,470, filed Aug. 8, 2005 now U.S. Pat. No. 7,234,757, which claims the benefit of U.S. Provisional Application Ser. No. 60/599,742, filed Aug. 6, 2004; this application further claims the benefit of U.S. Provisional Application Ser. No. 60/777,079, filed Feb. 27, 2006.

BACKGROUND OF THE INVENTION

1. Field of the Invention

The invention relates to an electrically-driven mechanical strut. More particularly, the present invention relates to an electromechanical strut used to raise or lower an automotive lift gate.

2. Description of Related Art

Lift gates provide a convenient access to the cargo areas of hatchbacks, wagons, and other utility vehicles. Typically, the lift gate is hand operated, requiring manual effort to move the lift gate between the open and the closed positions. Depending on the size and weight of the lift gate, this effort can be difficult for some users. Additionally, manually opening or closing a lift gate can be inconvenient, particularly when the user's hands are full.

Attempts have been made to reduce the effort and inconvenience of opening or closing a lift gate. One solution is to pivotally mount gas struts to both the vehicle body and the lift gate, reducing the force required for opening the lift gate. However, the gas struts also hinder efforts to close the lift gate, as the struts re-pressurize upon closing, increasing the effort required. Additionally, the efficacy of the gas struts vary according to the ambient temperature. Furthermore, the use of gas struts still requires that the lift gate is manually opened and closed.

U.S. Pat. No. 6,516,567 to Stone et al. (hereafter referred to as the '567 patent) provides a power actuator that works in tandem with a gas strut. The '567 power actuator comprises a motor mounted within the vehicle body coupled to a flexible rotary cable by a clutch. The flexible rotary cable drives an extensible strut that is pivotally mounted to both the vehicle body and the lift gate. Thus, the motor can raise or lower the lift gate conveniently without manual effort. A controller to engage and disengage the motor can be connected to a remote key fob button or a button in the passenger compartment, providing additional convenience.

The power actuator described in the '567 patent is not without its disadvantages. The power actuator is comprised of multiple parts, each of which needs to be assembled and mounted to the vehicle separately, increasing costs. The vehicle body must be specifically designed to provide a space to house the motor. Due to the limited space available, the motor is small and requires the assistance of the gas strut. Additionally, because the power actuator described in the '567 patent is designed to work in tandem with a gas strut, the gas strut can still vary in efficacy due to temperature. Thus, the motor provided must be balanced to provide the correct amount of power with varying degrees of mechanical assistance from the gas strut.

It is therefore desired to provide a means for raising and lowering a vehicle lift gate that obviates or mitigates at least one of the above-identified disadvantages of the prior art.

SUMMARY OF THE INVENTION

According to an embodiment of the invention, an electromechanical strut is provided for moving a pivotal lift gate in a motor vehicle body between a closed and an open position. The electromechanical strut comprises a housing, pivotally mountable to one of the motor vehicle body and the lift gate; an extensible shaft, one end of the shaft being slidably mounted to the housing, and the other end of the shaft being pivotally mounted to the other of the motor vehicle body and the lift gate; a drive mechanism, comprising a power screw, for converting rotary motion into linear motion of the extensible shaft in order to move it between a position corresponding to the closed position of the lift gate and an extended position corresponding to the open position of the lift gate; and a power spring, connected to the power screw within the housing, which assists the power screw.

The present invention provides an electromechanical strut using an inline motor coupled to an inline planetary gear that are both mounted in the housing. The motor-gear assembly drives a power screw and nut assembly in the upper housing, extending or retracting an extensible shaft. Additionally, a power spring mounted coaxially around the power screw urges the extensible shaft to the extended position and provides a mechanical counterbalance to the weight of a lift gate on the shaft. As the shaft extends, the power spring uncoils, assisting the motor-gear assembly in raising the lift gate. Retracting the shaft recoils the spring, storing potential energy. Thus, a lower torque motor-gear assembly can be used, reducing the diameter of the housing.

In another embodiment of the invention, an electromechanical strut is provided for moving a pivotal lift gate between an open position and a closed position relative to a motor vehicle body. The electromechanical strut includes a housing connected to one of the lift gate and the motor vehicle body. An extensible shaft is slidably mounted to the housing. The extensible shaft is connected to the other of the lift gate and the motor vehicle body. A drive mechanism includes a rotatable power screw. The drive mechanism converts rotary motion of the power screw into linear motion of the extensible shaft to move the extensible shaft between a retracted position corresponding to the closed position of the lift gate and an extended position corresponding to the open position of the lift gate. A power spring includes one end connected to the extensible shaft and another end connected to the housing for providing a mechanical counterbalance to the weight of the lift gate.

BRIEF DESCRIPTION OF THE DRAWINGS

The invention will now be described, by way of example only, with reference to the attached Figures, wherein:

FIG. 2 shows a cross-section view in side profile of one of the electromechanical struts shown in FIG. 1, shown in an extended position;

FIG. 3 shows a cross-section view in top profile of a spring housing on the electromechanical strut shown in FIG. 2;

DETAILED DESCRIPTION OF THE EMBODIMENTS

Figure 1:
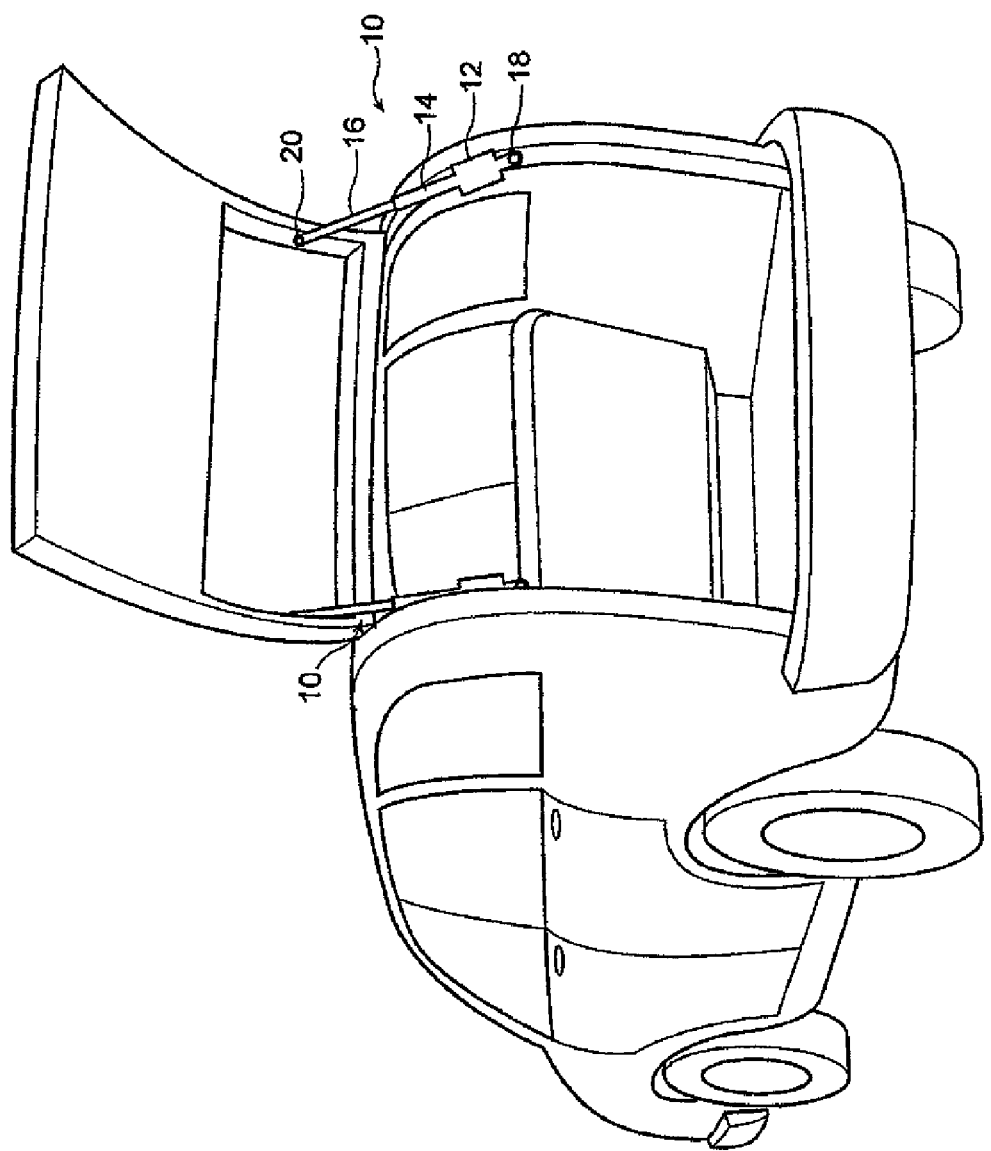
FIG. 1 shows a perspective view of a motor vehicle having a lift gate controlled by a pair of electromechanical struts in accordance with one embodiment of the invention.

Referring now to FIGS. 1 and 2, an embodiment of the invention mounted to a motor vehicle is shown generally at 10. Electromechanical strut 10 includes a lower housing 12, an upper housing 14, and an extensible shaft 16. A pivot mount 18, located at an end of lower housing 12 is pivotally mounted to a portion of the vehicle body that defines an interior cargo area in the vehicle. A second pivot mount 20 is attached to the distal end of extensible shaft 16, relative to upper housing 14, and is pivotally mounted to the lift gate of the vehicle.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body (not shown). Upper housing 14 provides a cylindrical sidewall 32 defining a chamber 34 that is open at both ends. A distal end wall 28 of lower housing 12 includes an aperture 30 so that chamber 24 and chamber 34 communicate with each other. Upper housing 14 has a smaller diameter than lower housing 12. However, it is contemplated that lower housing 12 and upper housing 14 can also be formed as a single cylinder or frusto-cone. Other form factors for lower housing 12 and upper housing 14 will occur to those of skill in the art. Upper housing 14 can be integrally formed with lower housing 12, or it can be secured to lower housing 12 through conventional means (threaded couplings, weld joints, etc). A motor-gear assembly 36 is seated in chamber 24.

The motor-gear assembly 36 includes a motor 42, a clutch 44, a planetary gearbox 46, and a power screw 40. Motor 42 is mounted within chamber 24 near end wall 26. Motor 42 is secured to at least one of cylindrical sidewall 36 and end wall 26 to prevent undesired vibrations or rotation, Motor 42 is a direct current bidirectional motor. Electrical power and direction control for motor 42 is provided via electrical cables that connect into the vehicle body through apertures (not shown) in end wall 26. The clutch 44 is connected to an output shaft 48 on motor 42. Clutch 44 provides a selective engagement between the output shaft 48 of motor 42 and the planetary gearbox 46. Clutch 44 is an electromechanical tooth clutch that engages planetary gearbox 46 when motor 42 is activated. When clutch 44 is engaged, torque is transferred from motor 42 through to planetary gearbox 46. When clutch 44 is disengaged, torque is not transferred between motor 42 and planetary gearbox 46 so that no back drive occurs if the lift gate is closed manually.

Planetary gearbox 46 is a two-stage planetary gear that provides torque multiplication for power screw 40. A ring gear 50 is driven by the teeth of clutch 44. In turn, a number of planetary gears 52 transfer power from ring gear 50 to power screw 40, which is centrally journaled within planetary gearbox 46, providing the desired gear ratio reduction to power screw 40. In the present embodiment, planetary gearbox 46 provides a 47:1 gear ratio reduction. Other gear ratio reductions will occur to those of skill in the art. Power screw 40 extends into upper housing 14.

Extensible shaft 16 provides a cylindrical sidewall 54 defining a chamber 56 and is concentrically mounted between upper housing 14 and power screw 40. As described earlier, pivot mount 20 is attached to the distal end of extensible shaft 16. The proximal end of extensible shaft 16 is open. A drive nut 58 is mounted around the proximal end of extensible shaft 16 relative to lower housing 12 and is coupled with power screw 40 in order to convert the rotational movement of power screw 40 into the linear motion of the extensible shaft 16 along the axis of power screw 40. Drive nut 58 includes two splines 60 that extend into opposing coaxial slots 62 provided on the inside of upper housing 14 to prevent drive nut 58 from rotating. The length of slots 62 defines the retracted and the extended positions of extensible shaft 16. Alternatively, a ball screw assembly could be used in lieu of drive nut 58 without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, end wall 28, and a flange 66. Within spring housing 38, a power spring 68 is coiled around power screw 40, providing a mechanical counterbalance to the weight of the lift gate. Preferably formed from a strip of steel, power spring 68 assists in raising the lift gate both in its powered and un-powered modes. One end of power spring 68 attaches to power screw 40 and the other is secured to a portion of cylindrical sidewall 22. When extensible shaft 16 is in its retracted position, power spring 68 is tightly coiled around power screw 40. As power screw 40 rotates to extend extensible shaft 16, power spring 68 uncoils, releasing its stored energy and transmitting an axial force through extensible shaft 16 to help raise the lift gate. When power screw 40 rotates to retract extensible shaft 16, power spring 68 recharges by recoiling around power screw 40.

Power spring 68 stores sufficient energy when coiled to drive power screw 40 to fully raise the lift gate, even when motor gear assembly 36 is not engaged (typically by unlatching the lift gate to raise it manually.) In addition to assisting to drive power screw 40, power spring 68 provides a preloading force that reduces starting resistance and wear for motor 42. Furthermore, power spring 68 provides dampening assistance when the lift gate is closed. Unlike a gas strut, power spring 68 is generally not affected by temperature variations, nor does it unduly resist manual efforts to close the lift gate. Although the present embodiment describes power spring 68 that uncoils to assist in raising a lift gate and recoils to lower a lift gate, it has been contemplated that a power spring 68 could be provided that uncoils when lowering a lift gate and recoils when raising a lift gate.

Figure 4:
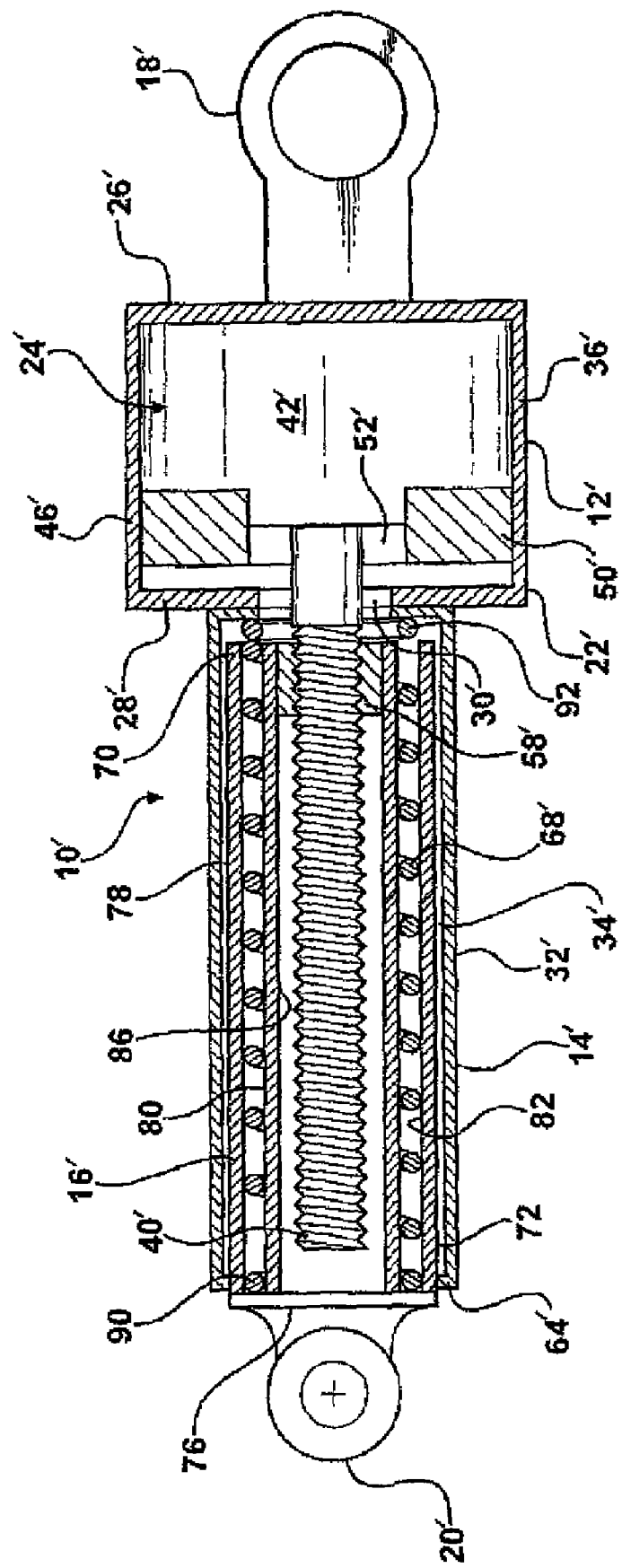
FIG. 4 shows a cross-section view in side profile of an electromechanical strut according to another embodiment in a retracted position.
Figure 5:
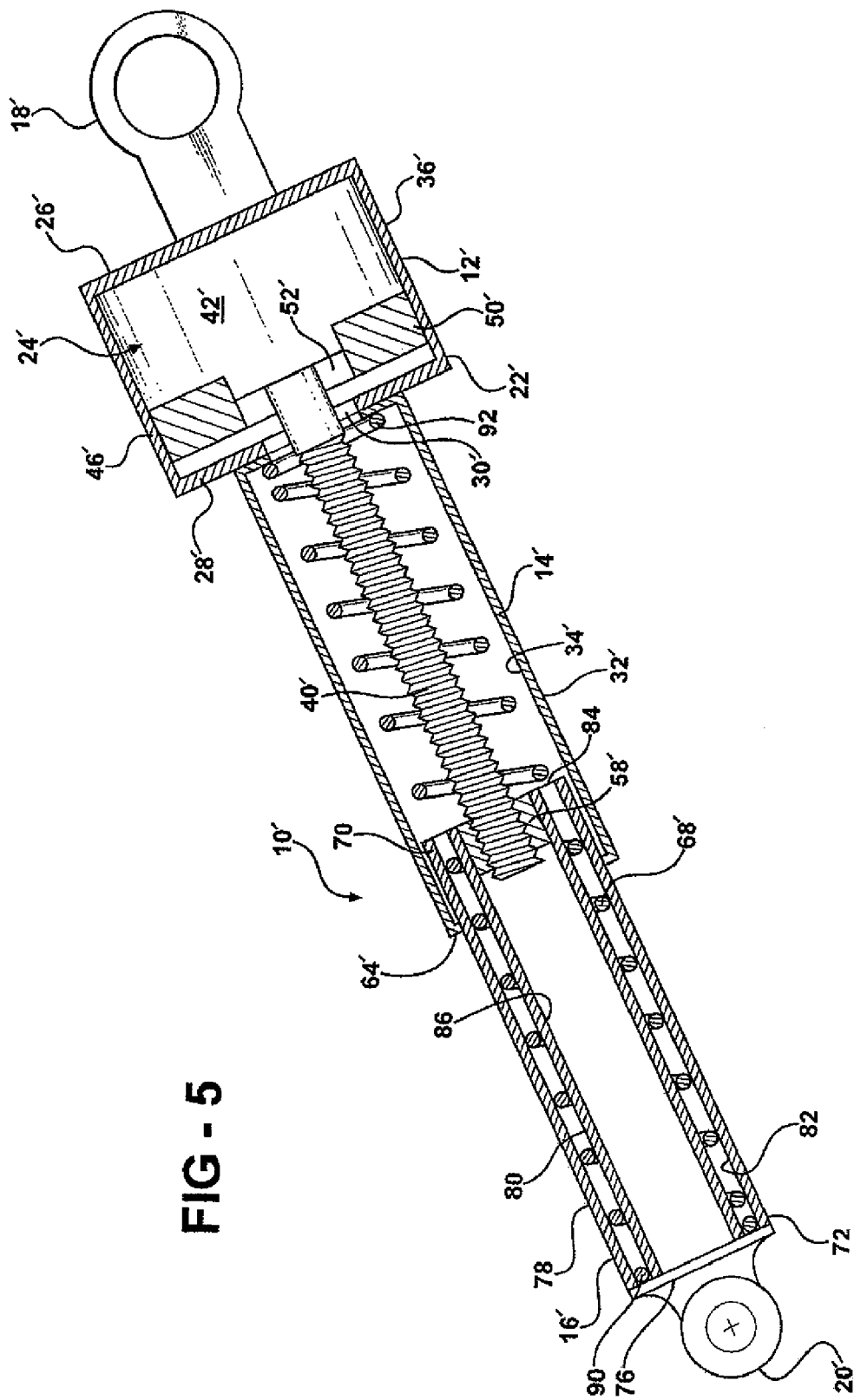
FIG. 5 shows a cross-section view in side profile of the electromechanical strut in an extended position.

Referring to FIGS. 4 and 5, wherein primed reference numerals represent similar elements as those set forth above, the electromechanical strut 10' according to another embodiment includes the lower housing 12' having the cylindrical sidewall 22' defining the chamber 24', and the upper housing 14' having the cylindrical sidewall 32' defining the chamber 34'. It is appreciated that the lower 12' and upper 14' housings may be formed as a single housing.

The electromechanical strut 10' also includes the extensible shaft 16' movable between a retracted position, shown in FIG. 4, corresponding to a closed position of the lift gate and an extended position, shown in FIG. 5, corresponding to an open position of the lift gate.

The motor-gear assembly 36' is seated within the chamber 24'. The motor-gear assembly 36' includes the motor 42', the planetary gearbox 46', and the power screw 40'. The planetary gearbox 46' includes the planetary gears 52' that transfer power from the ring gear 50' to the power screw 40'. In the current embodiment, the planetary gearbox 46' provides a 20:1 gear ratio reduction.

The extensible shaft 16' extends between opposing first 70 and second 72 ends. The first end 70 of the extensible shaft 16' is open and the second end 72 of the extensible shaft 16' is closed off by an end wall 76. The second end 72 of the extensible shaft 16' is connected to the pivot mount 20'.

The extensible shaft 16' includes an outer cylindrical wall 78, and an inner cylindrical wall 80 spaced apart inwardly from the outer cylindrical wall 78. One end of the inner cylindrical wall 80 is connected to the end wall 76. The outer cylindrical wall 78 and the inner cylindrical wall 80 define a toroidal chamber 82 therebetween. One end of the toroidal chamber 82 is closed off by the end wall 76 and an opposing end of the toroidal chamber 82 defines an opening 84. The inner cylindrical wall 80 further defines a cylindrical chamber 86 inward of the toroidal chamber 82. The cylindrical chamber 86 is separated from the toroidal chamber 82 by the inner cylindrical wall 80.

The drive nut 58' is rigidly mounted in the cylindrical chamber 86 of the extensible shaft 16'. The drive nut 58' is coupled with the power screw 40' in order to convert the rotational movement of the power screw 40' into linear motion of the extensible shaft 16' along a longitudinal axis 88 of the power screw 40'. The power screw 40' rotates in situ, that is, during rotation of the power screw 40' there is no linear motion of the power screw 40' relative to the lower housing 12' and the upper housing 14'. As such, the rotation of the power screw 40' effects linear movement of the extensible shaft 16' relative thereto.

The power spring 68' is seated within the toroidal chamber 82. The power spring 68' includes one end 90 connected to the second end 72 of the extensible shaft 16', and another end 92 connected to the upper housing 14' adjacent the lower housing 12'. The power spring 68' is a coil spring that uncoils and recoils as the extensible shaft 16 moves relative to the upper 14 and lower 12 housings. It is, however, appreciated that the particular type of spring may vary.

In powered operation, torque provided by the motor 42' is transferred via the planetary gearbox 46' to the screw 40', causing linear motion of the extensible shaft 16' as described above. For manual operation, the motor 42' and the planetary gearbox 46' must be back driven. The friction in the system due to the direct engagement of the motor 42' and the planetary gearbox 46' with the power screw 40' allows the lift gate to remain still in any intermediate position between the open and closed positions. The electromechanical strut 10' thus provides stable intermediate positions for the lift gate (useful, for example, for garages with low ceilings) without power consumption by using the internal friction of the motor-gear assembly 36'.

The power spring 68' provides a mechanical counterbalance to the weight of the lift gate. The power spring 68', which may be a coil spring, assists in raising the lift gate both in its powered and un-powered modes. When the extensible shaft 16 is in the retracted position, the power spring 68' is tightly compressed between the extensible shaft 16' and the lower housing 12'. As the power screw 40' rotates to extend the shaft 16', the power spring 68' extends as well, releasing its stored energy and transmitting an axial force through the shaft 16' to help raise the lift gate. When the power screw 40' rotates to retract the extensible shaft 16', or when the lift gate is manually closed, the power spring 68' is compressed between the shaft 16' and the lower housing 12' and thus recharges.

In addition to assisting in driving the power screw 40', the power spring 68' also provides a preloading force for reducing starting resistance and wear of the motor 42'. Furthermore, the power spring 68' provides dampening assistance when the lift gate is closed. Unlike a gas strut, the power spring 68' is generally not affected by temperature variations, nor does it unduly resist manual efforts to close the lift gate.

It is appreciated that a ball screw assembly, as known in the art, could be used in lieu of the drive nut 58'. Also, although reference has been made specifically to a lift gate, it is also appreciated that the invention may be applied to a variety of other closure panels such as trunks or deck lids.

The above-described embodiments of the invention are intended to be examples of the present invention and alterations and modifications may be effected thereto, by those of skill in the art, without departing from the spirit of the invention.

What is claimed:

1. An electromechanical strut for moving a pivotal lift gate between an open position and a closed position relative to a motor vehicle body, the electromechanical strut comprising:
    a housing connected to one of the lift gate and the motor vehicle body;
    an extensible shaft slidably mounted to the housing, the extensible shaft connected to the other of the lift gate and the motor vehicle body;
    a drive mechanism including a rotatable power screw, the drive mechanism converting rotary motion of the power screw into linear motion of the extensible shaft to move the extensible shaft between a retracted position corresponding to the closed position of the lift gate and an extended position corresponding to the open position of the lift gate; and
    a power spring having one end connected to the extensible shaft and another end connected to the housing for providing a mechanical counterbalance to the weight of the lift gate.

2. An electromechanical strut as set forth in claim 1 including a motor-gear assembly operably coupled to the power screw.

3. An electromechanical strut as set forth in claim 2 including a drive nut fixedly secured to the extensible shaft and threadedly engaging the power screw.

4. An electromechanical strut as set forth in claim 3 wherein the extensible shaft includes an inner cylindrical wall dividing an interior of the extensible shaft into first and second chambers.

5. An electromechanical strut as set forth in claim 4 wherein the power spring is received within the first chamber.

6. An electromechanical strut as set forth in claim 5 wherein the power screw is received within the second chamber.

7. An electromechanical strut as set forth in claim 6 wherein the second chamber is disposed radially inwardly from the first chamber.

8. An electromechanical strut as set forth in claim 1 wherein the power spring is a coil spring that uncoils and recoils as the extensible shaft moves relative to the housing.

9. An electromechanical strut for moving a pivotal lift gate between an open position and a closed position relative to a motor vehicle body, the electromechanical strut comprising:
    a housing connected to one of the lift gate and the motor vehicle body;
    an extensible shaft slidably mounted to the housing and connected to the other of the lift gate and the motor vehicle body, the extensible shaft including spaced apart outer and inner cylindrical walls defining a toroidal chamber therebetween;
    a drive mechanism including a rotatable power screw, the drive mechanism converting rotary motion of the power screw into linear motion of the extensible shaft to move the extensible shaft between a retracted position corresponding to the closed position of the lift gate and an extended position corresponding to the open position of the lift gate; and a power spring disposed within the toroidal chamber of the extensible shaft for providing a mechanical counterbalance to the weight of the lift gate.

10. An electromechanical strut as set forth in claim 9 wherein the power spring includes one end connected to the extensible shaft and another end connected to the housing.

11. An electromechanical strut as set forth in claim 10 wherein the inner cylindrical wall of the extensible shaft defines a cylindrical chamber opposite the toroidal chamber for receiving the power screw.

12. An electromechanical strut as set forth in claim 11 wherein the extensible shaft includes a first end closed by an end wall and an opposing second end in open communication with the housing.

13. An electromechanical strut as set forth in claim 12 wherein the toroidal chamber includes an opening at the second end of the extensible shaft for receiving the power spring therethrough.

14. An electromechanical strut as set forth in claim 13 wherein the power spring uncoils and recoils as the extensible shaft moves relative to the housing.

15. An electromechanical strut as set forth in claim 14 including a motor-gear assembly operably coupled to the power screw.

16. An electromechanical strut as set forth in claim 15 including a drive nut fixedly secured to the extensible shaft and threadedly engaging the power screw.

17. An electromechanical strut for moving a pivotal lift gate between an open position and a closed position relative to a motor vehicle body, the electromechanical strut comprising:

a housing connected to one of the lift gate and the motor vehicle body;

an extensible shaft movable relative to said housing and connected to the other of the light gate and the motor vehicle body;

a drive mechanism including a power screw rotating in situ, said drive mechanism converting rotary motion of said power screw into linear motion of said extensible shaft to move said extensible shaft between a retracted position corresponding to the closed position of the lift gate and an extended position corresponding to the open position of the lift gate; and a power spring disposed within said housing and kinematically coupled to said extensible shaft for providing a mechanical counterbalance to the weight of the lift gate.

18. An electromechanical strut as set forth in claim 17 including a motor-gear assembly operably coupled to the power screw.

19. An electromechanical strut as set forth in claim 18 including a drive nut fixedly secured to the extensible shaft and threadly engaging the power screw.

* * * * *